United States Patent [19]

Taylor

[11] 4,300,250
[45] Nov. 17, 1981

[54] BEEHIVES

[76] Inventor: Merritt I. Taylor, 8220 Brookfield Rd., Richmond, Va. 23227

[21] Appl. No.: 115,449

[22] Filed: Jan. 25, 1980

[51] Int. Cl.³ .................. A01K 47/00; A01K 47/06
[52] U.S. Cl. .............................................. 6/1; 6/4 R
[58] Field of Search ............... 6/1, 4 R, 4 B; 126/417, 126/450

[56] References Cited

U.S. PATENT DOCUMENTS

| | | | |
|---|---|---|---|
| 2,188,719 | 1/1940 | King | 6/4 R |
| 2,506,118 | 5/1950 | Taylor | 6/1 |
| 2,530,801 | 11/1950 | Babcock, Jr. | 6/1 |
| 2,654,900 | 10/1953 | Kelly | 6/1 |
| 2,680,858 | 6/1954 | Baumgartner | 6/1 |
| 4,015,582 | 4/1977 | Liu et al. | 126/450 |
| 4,033,325 | 7/1977 | Walker | 126/450 X |

*Primary Examiner*—Hugh R. Chamblee
*Attorney, Agent, or Firm*—LeBlanc, Nolan, Shur & Nies

[57] ABSTRACT

Beehives which feature passive solar heating, the venting of moisture, wind protected bee entrances, closeable bottom boards of sufficient depth to encourage breeding, and other attributes that minimize wintertime losses attributable to starvation, dysentery, and other causes.

20 Claims, 12 Drawing Figures

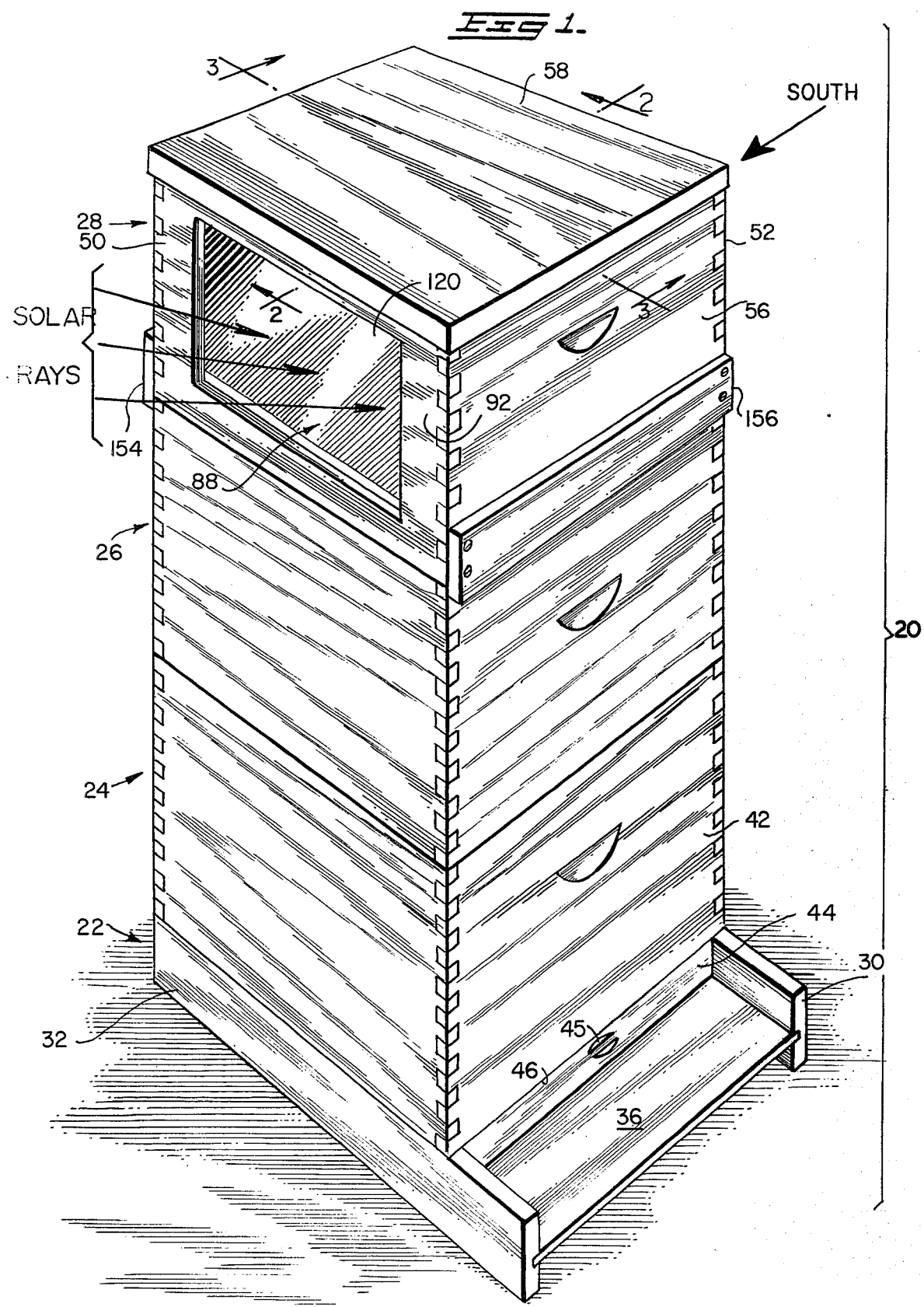

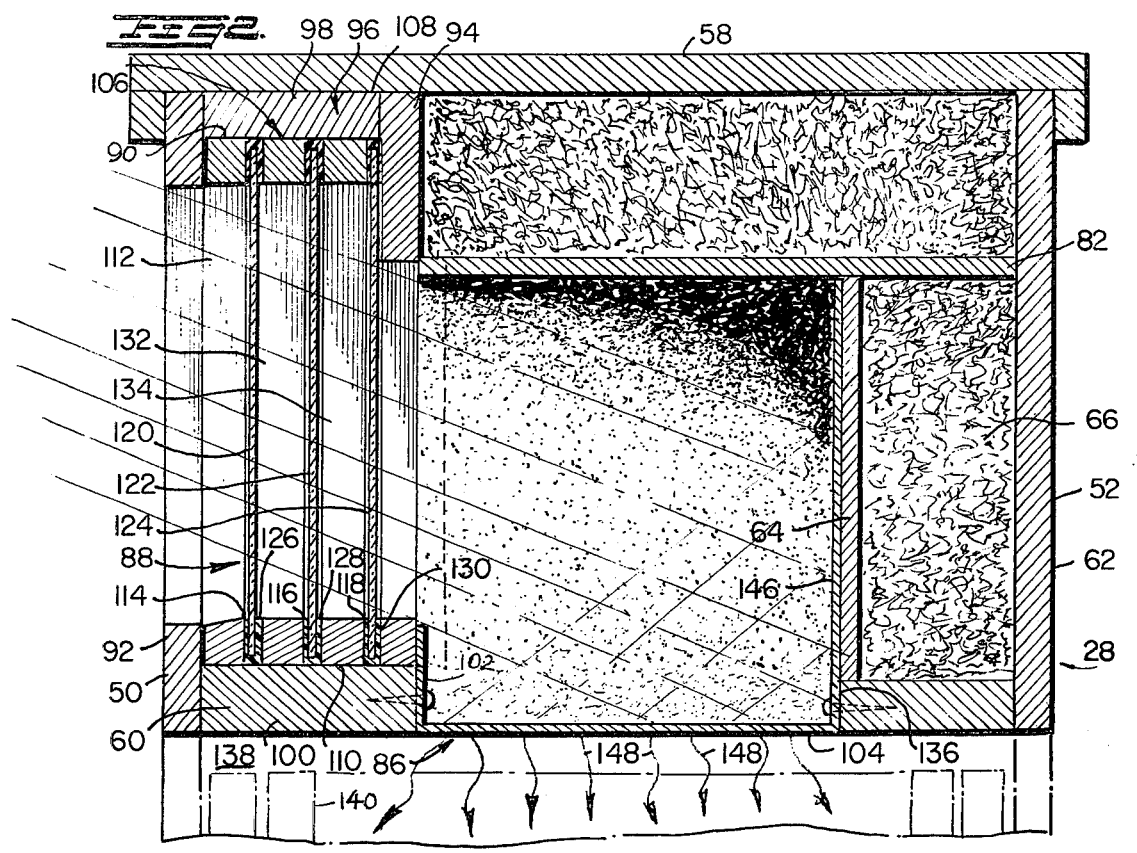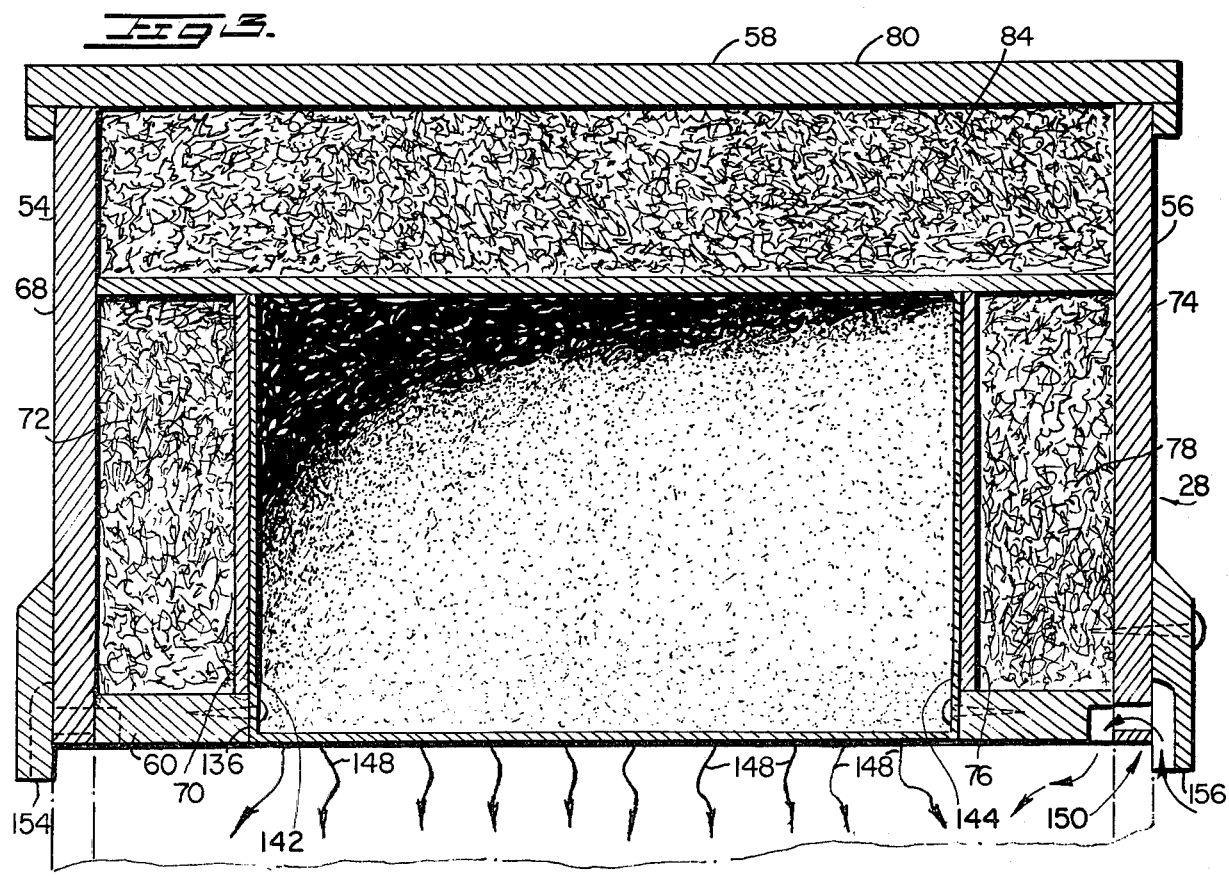

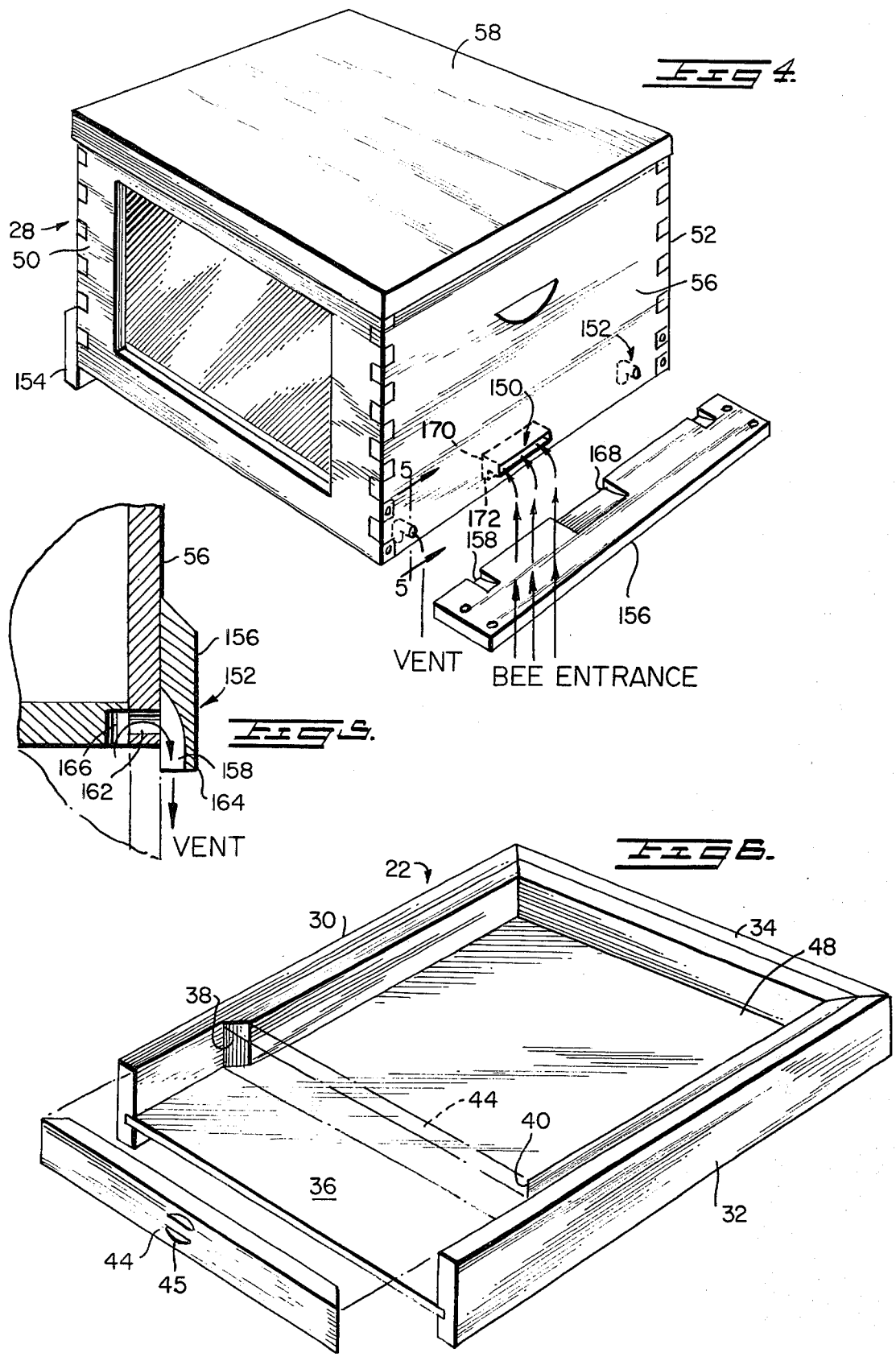

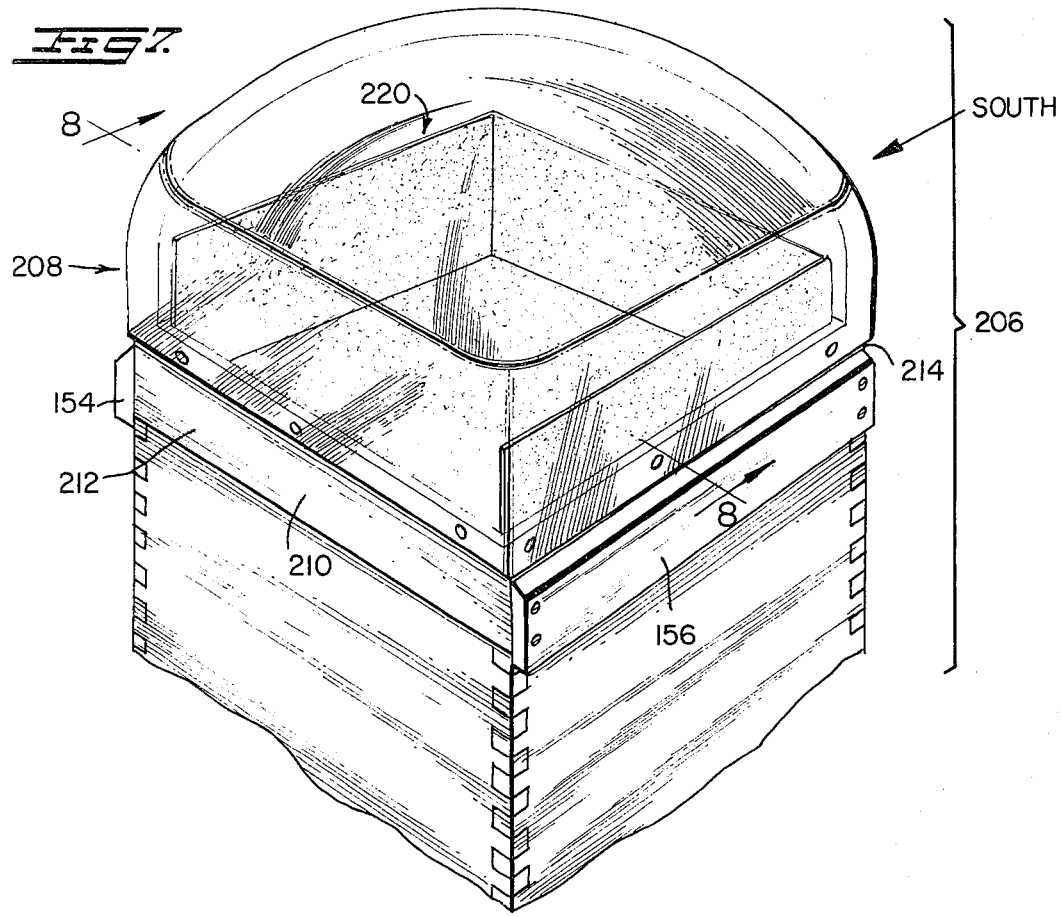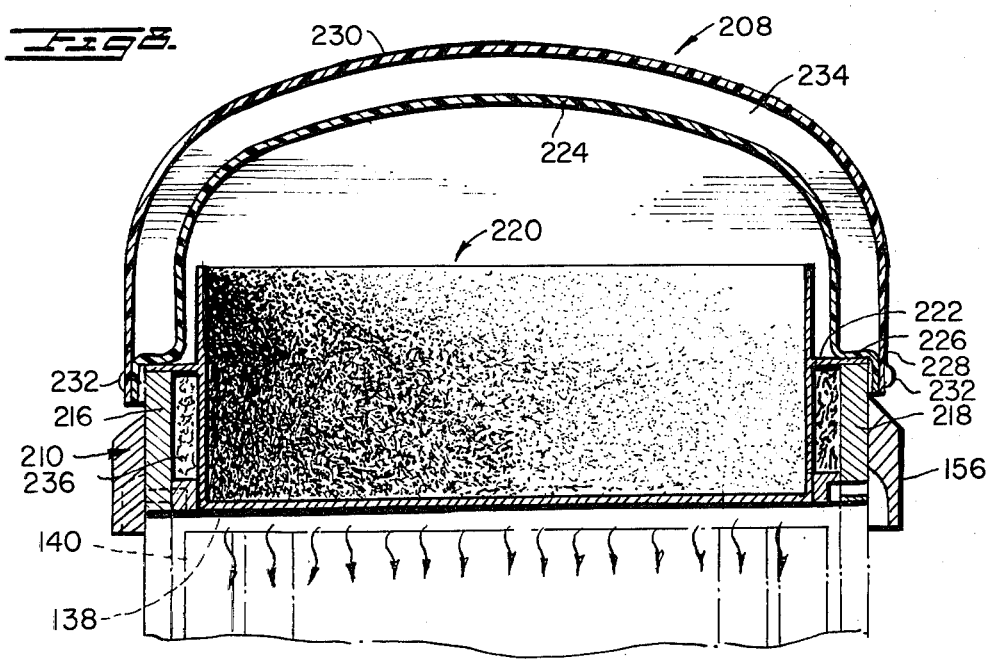

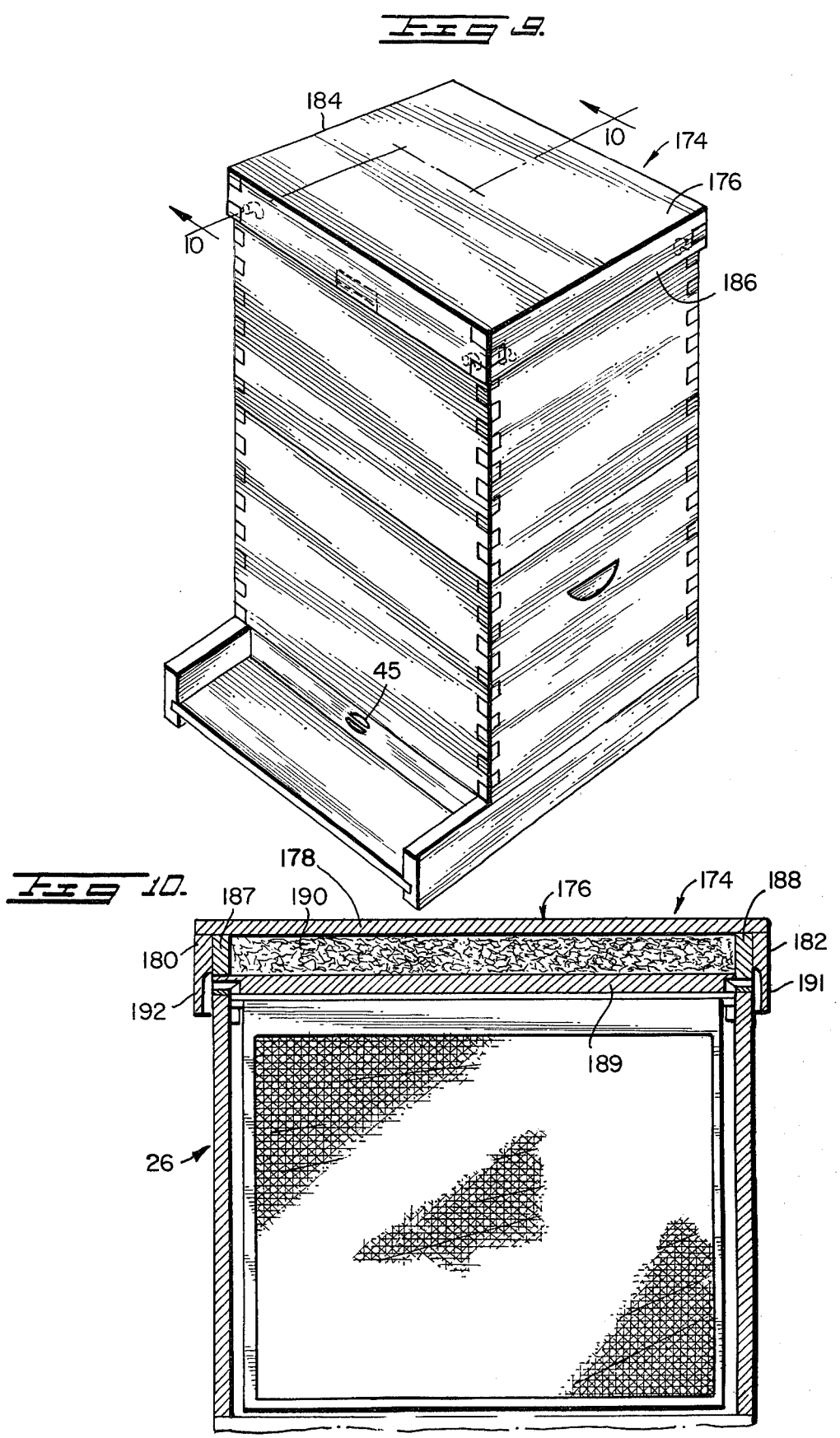

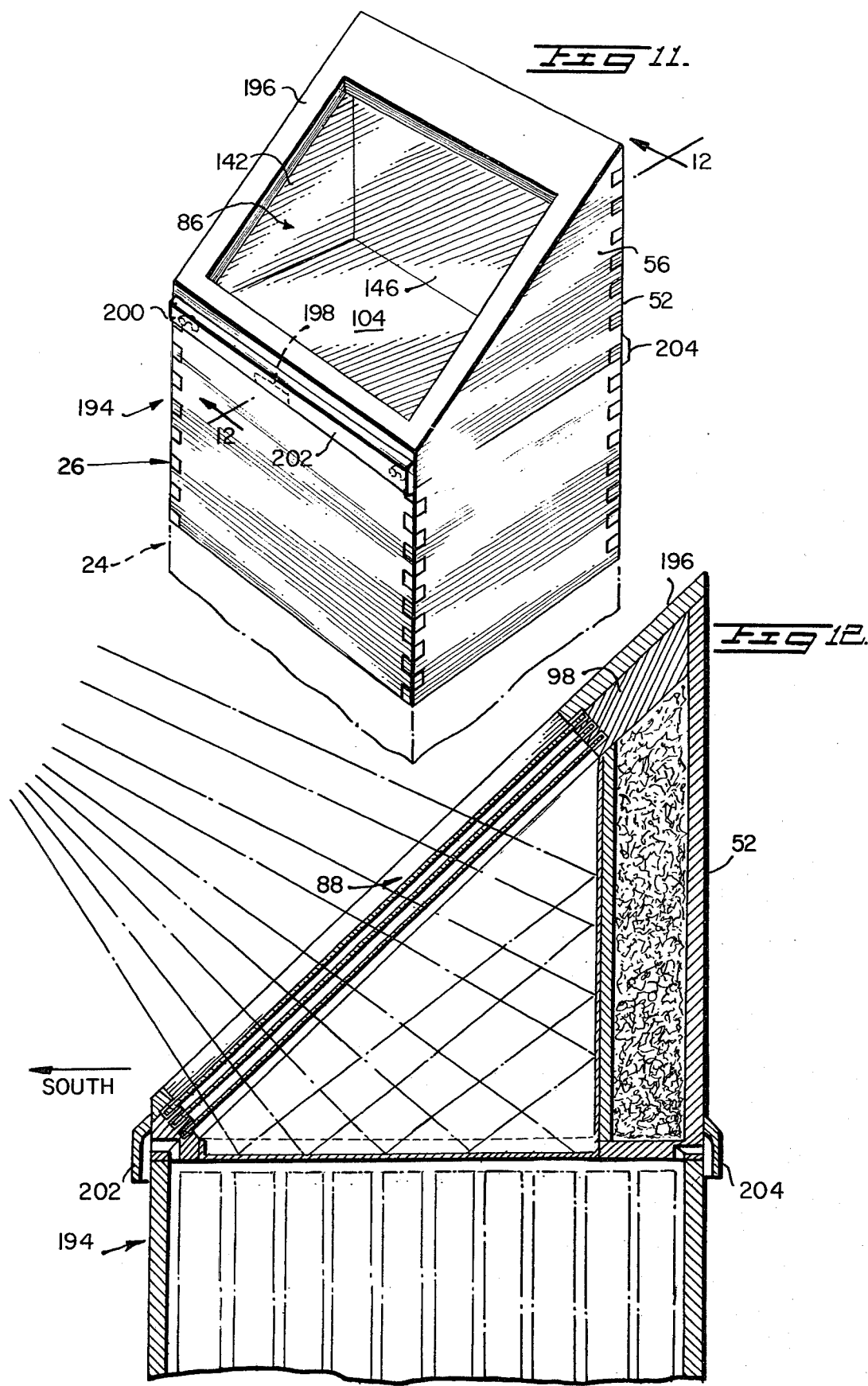

BEEHIVES

The present invention relates to beehives and, more particularly, to novel, improved beehives which are capable of significantly minimizing winter losses to, and weakening of, honey bee colonies.

The overwintering of bee colonies has heretofore been practiced only to a limited extent, especially in areas where more severe climatic conditions prevail, because of the losses suffered during the winter months. Consequently, the prevailing practice is to replace the existing colony each spring with package bees. At current prices this practice can make beekeeping an entirely unprofitable venture.

Two major causes of wintertime bee loses are dysentery and starvation. Both are traceable to prolonged exposure to low temperatures.

Dysentry is caused by retention of feces which are normally evacuated in cleansing flights outside the hive. During cold weather, bees cannot make cleansing flights; and dysentery is consequently the result if the temperature remains low during extended periods.

Prolonged exposure to low temperatures can also lower vitality to a level where bees cannot uncap fresh stores of honey even though they may be but a few inches away.

The effects of cold weather are exacerbated by condensation in the hive, a condition which commonly prevails in hives of conventional construction. Bees can easily survive sub-zero temperatures in a dry hive, but weaken and die rapidly at more moderate temperatures if the hive is damp.

In one aspect, the present invention relates to novel, improved beehives in which wintertime losses are minimized by promoting internal temperature conditions that will allow the colony to make cleansing flights and to reach and uncap fresh sources of nourishment and by promoting the elimination of moisture from the hive.

Favorable temperature conditions are promoted primarily by a passive solar unit which collects solar energy and conducts it to a radiant grid above the cluster. The use of this novel arrangement, especially in association with appropriate insulation, insures, with considerable certainty, that conditions favorable to cleansing flights and to feeding will occur with sufficient regularity to maintain healthy colonies.

The maintenance of a dry hive is promoted by a novel ventilating arrangement which insures that water vapor in suspension is not trapped in the hive and which keeps rain and snow from being blown into the hive while furnishing ready access and egress for the bees. My novel solar cover construction also eliminates the inner cover necessarily added when conventional top covers are employed.

The use of a passive solar energy system in minimizing winter losses to honey bee colonies has, to my knowledge, heretofore been proposed only in Paul, "Use of Passive Solar Energy for Overwintering Honey Bees", *American Bee Journal,* October 1979, pages 724, 725, and 729. The Paul collector, however, is quite different from mine in that it is a cumbersome, tentlike affair in which the hive is housed rather than an integral part of the hive's top cover as mine is.

Beehives of the character I have invented are, also, conceptually quite different from those heated beehives heretofore proposed in the patent literature. It was attempted, in such hives, to heat the air in the hive—see, for example, U.S. Pat. No. 3,994,034 issued Nov. 30, 1976, to van Damme et al and my U.S. Pat. No. 2,506,118 issued May 2, 1950. I have since found that this merely confuses the bees and, consequently, is actually counterproductive.

In another aspect my invention resides in the provision of a novel top cover which encompasses the ventilating and other important features of those described above except for the passive solar energy collector. Such covers are less complex and expensive yet may prove entirely satisfactory under all but the more demanding climatic conditions.

Ventilated top covers which resemble mine to some extent are disclosed in U.S. Pat. Nos. 2,530,801 issued Nov. 21, 1950, to Babcock; 2,548,275 issued Apr. 10, 1951, to Watkins; 2,578,103 issued Dec. 11, 1951, to Stulce; and 4,135,265 issued Jan. 23, 1979, to van de Kerkof. Closer inspection, however, reveals that the resemblance is only superficial.

The van de Kerkof cover is complex and would be correspondingly expensive. It also requires a complicated inner cover, whereas my novel ventilated top cover completely eliminates the need for an inner cover.

The Babcock cover has much less efficient ventilation than my novel cover; and it, too, is more complex, requiring, as it does, a perforated metal inner cover and other components which I have found are unnecessary. The Watkins cover, similarly, has a number of components made unnecessary by my novel, ventilated, top cover design.

The Stulce cover is simple, but it does not provide protection against strong winds or driving rain or snow.

A related aspect of my invention is the provision of a novel closure for the bee opening left between the bottom board of a beehive and the body supported on the bottom board in a conventional beehive.

Contrary to what is accepted, I have found that this bottom hive opening can be closed during cold weather and adequate oxygen nevertheless secured although this requires that a top cover with entrance and ventilating features of the present invention be employed.

This novel wintertime beehive modification eliminates unwanted, damaging drafts in the hive. It also provides a space in which the colony can cluster and rear brood during winter months so that the colony will be strong enough to split before the main honey flow begins.

A beehive with a removable closure is described in that patent to van Damme et al identified above. However, that closure is not intended to be used in the same manner as my novel bottom opening closure or for my purposes. For example, the electrical heater in the lower reaches of the van Damme et al beehive would keep bees from using the space above the bottom board for rearing of brood.

From the foregoing, it will be apparent to the reader that one important, primary object of my invention resides in the provision of novel, improved beehives working with bee instinct.

A related, important, and primary object of my invention is the provision of beehives with an improved capability for minimizing losses in overwintered bee colonies.

Other important, but more specific, objects of my invention reside in the provision of beehives in accord with the preceding objects:

in which solar energy is utilized to promote conditions favorable to cleansing flights and the gaining of access to food stores, thereby eliminating major causes of losses in overwintered bee colonies;

which promote escape of moisture from the hive while inhibiting the ingress of rain and snow, thereby maintaining a dry hive;

which minimize drafts in the hive;

which promote the rearing of brood during the winter months;

which have various combinations, or all, of the foregoing features.

Other important objects and features and additional advantages of my invention will be apparent from the foregoing, from the appended claims, and from the ensuing detailed description and discussion as it proceeds in conjunction with the accompanying drawing, in which:

FIG. 1 is a pictorial view of a beehive constructed in accord with and embodying the principles of the present invention;

FIG. 2 is a section through a solar cover of the beehive shown in FIG. 1; the section is taken substantially along line 2—2 of FIG. 1;

FIG. 3 is a section through the solar cover taken substantially along line 3—3 of FIG. 1;

FIG. 4 is a pictorial view of the solar cover with a baffle removed to show certain vents and a bee entrance;

FIG. 5 is a section through the solar cover taken essentially along line 5—5 of FIG. 4;

FIG. 6 is a pictorial view of a novel beehive bottom board embodying and constructed in accord with the principles of the present invention.

FIG. 7 is a pictorial view of a beehive with a second form of solar cover constructed in accord with the principles of the present invention;

FIG. 8 is a section through the beehive of FIG. 7, taken substantially along line 8—8 of the latter Figure;

FIG. 9 is a pictorial view of a beehive with a new form of top cover constructed in accord with the principles of the present invention;

FIG. 10 is a section through the beehive of FIG. 9, taken substantially along line 10—10 of the latter Figure;

FIG. 11 is a partial, pictorial view of a fourth embodiment of my invention, and FIG. 12 is a section through the embodiment of FIG. 11, taken substantially along line 12—12 of FIG. 11.

Referring now to the drawing, FIG. 1 depicts a beehive 20 which includes a bottom board 22, lower and upper hive bodies 24 and 26 supported from the bottom board, and a novel solar unit 28 supported from upper hive body 26.

Hive bodies 24 and 26 are of conventional, commercially available construction; and they will accordingly not be described further herein except to the extent necessary to elucidate the principles of the present invention.

Bottom board 22, shown in more detail in FIG. 6, is of conventional construction to the extent that it includes vertically oriented side and rear walls 30, 32, and 34 and a floor 36 supported from those side and rear walls. It differs from a conventional bottom board, however, in that ledges 38 and 40 facing the front of the bottom board are formed in the inner portions of side walls 30 and 32 at locations corresponding to the front wall 42 of lower hive body 24 and in that the bottom board is equipped with a removable closure 44. As shown in FIG. 1 and in phantom lines in FIG. 6, closure 44 extends from floor 36 to the lower edge of lower hive body front wall 42 and can be secured against ledges 38 and 40 during cold weather to close the normal bottom opening 46 of hive 20. Screws (not shown) will typically be employed to removably secure closure 44 in place, and an integral double hand grip 45 will typically be provided to facilitate its removal.

As discussed above, this novel bottom board construction is important because it eliminates drafts in the hive without interferring with the elimination of unwanted moisture therefrom and because it provides a closed two inch deep cluster space 48 between the floor of the bottom board and the bottom of lower hive body 24 in which the colony can rear brood during cold weather, until spring inspection when the lower entrance is reactivated by replacing closure 44 with a conventional slotted rack (not shown).

Referring again to FIG. 1, and also to FIGS. 2 and 3, the novel solar unit 28 of beehive 20 has front and rear walls 50 and 52 and side walls 54 and 56, all of which are vertically oriented, and horizontal top and bottom walls 58 and 60. The rear wall 52, side walls 54 and 56, and top wall 58 each have an outer and inner wall component with insulation sandwiched therebetween. The components of those walls are identified in the drawing by the reference characters indicated in the following tabulation:

TABLE 1

| Wall | Outer Member | Inner Member | Insulation |
|---|---|---|---|
| 52 | 62 | 64 | 66 |
| 54 | 68 | 70 | 72 |
| 56 | 74 | 76 | 78 |
| 58 | 80 | 82 | 84 |

This just-described insulation system cooperates with a passive solar energy collection system, described briefly above, to promote an internal hive environment that will allow an overwintered colony to make cleansing flights and reach fresh sources of nourishment and which will, moreover, occasion dry conditions in the hive, thereby eliminating major causes of losses in overwintered honey bee colonies.

The just alluded to passive solar energy collection system includes a solar energy collector 86 and a triple glazed window 88 for transmitting solar energy to the collector.

Window 88 is mounted in an opening 90 in hive cover front wall 50.

The front wall is made up of front and rear members 92 and 94 with a rectangular frame 96 in part sandwiched therebetween as is best shown in FIG. 2.

Frame 96, in turn, includes upper and lower members 98 and 100 and the inner members 70 and 76 of side walls 54 and 56.

Window 88 is dimensioned to match frame 96 and is retained in place in the latter by the inner and outer (front and rear) members 92 and 94 of front wall 50 and by a flange 102 extending upwardly from the bottom 104 of solar collector 86 at the front side thereof.

Referring still especially to FIG. 2, window 88 is composed of a rectangular frame 106 having top and bottom members 108 and 110 and side members 112 (only one of which is shown). Those frame members are grooved as indicated by reference characters 114, 116, and 118 to accept three panes of glass 120, 122, and 124 in the vertical, parallel, spaced apart relationship shown in FIG. 2.

A silicone or other glaze is provided between the panes and frame 96 as indicated by reference characters 126, 128, and 130 to provide two insulating, dead air spaces 132 and 134. This arrangement also contributes to the maintenance of a favorable environment in hive 20 under wintertime conditions.

Referring now specifically to FIGS. 2 and 3, the passive solar collector 86, alluded to briefly above, is a generally rectangular box of copper or other material with high thermal conductivity. It is flush mounted in an opening 136 formed in the bottom wall 60 of solar unit 28. As shown in FIG. 2, this leaves a cluster space 138, typically on the order of three-eighths inch deep, between the bottom of solar unit 28 and the upper ends of frames 140 in upper hive body 26.

Aside from the previously discussed flange 102 and bottom member 104, passive solar energy collector 86 includes sides 142 and 144 and a rear 146. Those parts of the collector are vertically oriented and juxtaposed to the inner components of the corresponding hive cover walls.

Solar unit 28 is oriented with window 88 facing south so that the maximum amount of solar energy will be transmitted to the hive interior during the winter months (see FIG. 1). As shown in FIG. 2, this energy impinges on the bottom 104 of collector 86, which is preferably coated to increase its absorptivity, or is reflected thereonto, from the sides and rear 142-146 of the collector. This causes the bottom 104 of the collector to emit radiant energy into the bee space 138 between cover 28 and upper hive body frames 140 as indicated by arrows 148 in FIGS. 2 and 3.

Other novel and important features of solar unit 28 discussed above, are bee entrances 150 and the vents 152 from which water vapor escapes from solar unit 28. Both the bee entrances and vents are so constructed that they are protected from wind and from rain, snow, and other precipitation.

Specifically, as is best shown in FIGS. 1, 3, 4, and 5, the bee entrances and vents are in part formed in cleats 154 and 156 fastened to outer members 68 and 74 of solar unit side walls 54 and 56, these cleats also serving to position the solar unit 28 on upper hive body 26 as is shown in FIGS. 1 and 3.

The vents and bee entrances are identical except for their lateral dimensions (see FIG. 4). Consequently, only the vents will be described in detail with the corresponding parts of bee entrances 150 being identified in Table 2 below.

I preferably provide four vents 152, one at each corner of solar unit 28. The cleat opposite the entrance is cut away for insertion of a hive tool to remove the solar cover.

The exemplary vent 152 shown in FIG. 5 includes a vertically extending passage 158 which is formed on the inner side of cleat 156 and which communicates with the ambient surroundings at its lower end.

At a higher level, passage 158 communicates with the outer end of a horizontal passage 162 through the outer member 74 of solar unit side wall 56. This passage is shielded from wind and even driven precipitation by the solid, outer and lower baffle forming part 164 of cleat 156.

Passage 162 communicates, at its inner end, with a downwardly extending passage 166 through the bottom 60 of the solar unit. Passage 166 opens, at its lower end, onto bee space 138 (see especially FIG. 3) and communicates, through that space, with the interior of the upper and lower hive bodies 26 and 24 and the brood space 48 between the latter and bottom board 22.

The just described combination of upwardly, inwardly, and downwardly extending passages further insures against wind and driven precipitation penetrating into the bee space 138 or further into the hive.

The previously alluded to reference character table showing the relationship between the components of the vents and the bee inlets, typically provided at opposite sides of the hive as shown in FIG. 3, follows:

TABLE 2

| Component | Vent | Bee Entrance |
|---|---|---|
| Vertical Passage (156) | 158 | 168 |
| Horizontal Passage (74) | 162 | 170 |
| Downwardly Extending Passage (60) | 166 | 172 |

It was pointed out above that the novel moisture venting and bee entrance arrangements just described can be employed independently of the solar energy collector system in applications of my invention where climatic conditions are less severe or where, for another reason, the added complexity and expense of the solar collector system are not warranted.

A top cover of this simpler character is illustrated in FIGS. 9 and 10 and identified by reference character 174.

In describing that embodiment of my invention, and those which follow hereinafter, like reference characters will for the most part be employed to identify components which are primarily alike.

Turning then to the drawing, cover 174, which also makes a conventional inner cover unnecessary, has an outer and upper part 176 made up of a top 178, depending front and rear members 180 and 182, and similarly oriented sides 184 and 186.

Housed within this outer part 176 of top cover 174 are front and rear inner members 187 and 188 and a bottom 189. Insulation 190 is sandwiched between the upper and lower (top and bottom) members 178 and 189 of the cover.

The inner members of the cover rest on upper hive body 26, and the vertically depending members of upper/outer component 176 locate the cover with respect to the upper hive body (see FIG. 10).

Bee entrances 191 and vents 192 are provided in cover 174. They are formed in components 180 (or 182), 187 (or 188), and 189 of the top cover, thus differing from the corresponding bee entrances and vents of top cover 28 only in that they are formed on the front and rear rather than the sides of the cover. This is of course not critical, but it is only intended to further illustrate the versatility of my invention.

Shaborshov, "Beekeeping in the U.S.S.R.", *American Bee Journal,* October 1979, pages 716-178, depicts beehives in which the rectangular, flat-top cover commonly used in this country is replaced with a trapezoidally configured cover having a slanted top, apparently to reduce snow loads.

That the principles of the present invention can be incorporated in covers of the configuration just described is evident from the beehive illustrated in FIGS. 11 and 12 and identified by reference character 194.

The solar unit 196 of beehive 194 is otherwise much like solar unit 28 except that the bee entrances 198 and vents 200 are formed in cleats 202 and 204 at the front and rear of the cover in a manner akin to that shown in FIGS. 9 and 10. Minor features which distinguish solar unit 196 from solar unit 28 are modifications in the configurations of window 88, the passive, solar energy collector 86, and side and rear walls 52, 54, and 56.

Thus far, those beehive covers employing a passive solar energy collection system in accord with the principles of the present invention have included a framed window construction. That this is unnecessary and that a bubble type construction may instead be employed, for example, is readily apparent from the beehive illustrated in FIGS. 7 and 8 and identified by reference character 206.

The solar unit 208 of beehive 206 has a rectangular frame 210 made up of front and rear members 212 and 214 and side members 216 and 218. Cleats 154 and 156 are fastened to the latter in a manner akin to that shown in FIG. 1 and for the same purposes.

The moist air vents and bee entrances of solar unit 208 have been identified by the same reference characters (152 and 150) as they were in FIG. 4 as they are essentially identical to the latter.

The passive solar collector 220 of solar unit 208 is like the collector 86 of solar unit 28 except for a horizontal flange 222 around the two sides and rear of the collector. As best shown in FIG. 8, this flange supports the collector from solar unit frame 210. As in the previously described embodiments of my invention, the bottom of the collector is flush with the bottom of the solar unit.

Also supported from frame 210 of solar unit 208, and above flange 222, is an inner bubble 224 of a radiant energy transmitting material. Typically, this bubble will be vacuum formed or otherwise molded from an appropriate synthetic such as Lucite although other plastics and even glass may of course be employed.

As best shown in FIG. 8, inner bubble 224 is of generally domelike configuration. It has a horizontally extending support flange 226 followed, at its outer edge, with a depending flange 228 which positions the inner bubble on frame 210.

The final major component of solar unit 208 is an outer bubble 230, also fabricated of a material capable of transmitting radiant energy. At its lower edge, outer bubble 230 is fastened to the frame 210 of solar unit 208 and sealed against the depending flange 228 of the inner bubble by fasteners 232. This provides an insulating, dead air space 234 between the two bubbles, illustrating that a double as opposed to triple glazed "window" may be sufficient, depending upon the application of my invention.

As indicated by reference character 236, insulation can be packed between the three sides of passive solar collector 220 and the corresponding side forming members of solar unit frame 210 to further minimize heat losses from the hive, if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalence of the claims are therefore intended to be embraced therein.

What is claimed and desired to be secured by Letters Patents is:

1. A beehive comprising a body and a removable solar unit mountable on and supportable by said body, said body of said beehive having a cluster space spanning and opening onto the upper end thereof and said solar unit having radiant energy transmitting means through which solar energy can penetrate to the interior thereof and an internally housed passive collector means for intercepting and absorbing said solar energy and for thereupon emitting radiant energy into the upper reaches of said beehive body, said passive solar collector means comprising a sheetlike member of thermally conductive material which faces and communicates directly with said cluster space on the upper side thereof.

2. A beehive as defined in claim 1 in which there is a bee entrance in said solar unit providing communication between the exterior of the beehive and the interior of the beehive body at the upper end thereof and in which said solar unit includes a baffle means overlying said bee entrance to minimize the formation of drafts in the beehive by wind blowing thereinto through said bee entrance.

3. A beehive as defined in either of the preceding claims 1 or 2 in which there is at least one vent for moisture laden air in the lower reaches of said solar unit and in which said unit includes a baffle means overlying said vent to minimize the formation of drafts in the beehive by wind blowing thereinto through said vent.

4. A beehive as defined in claim 1 in which said collector means comprises a three-sided box oriented with its bottom facing the upper end of the beehive body and in which said solar unit includes thermal insulation surrounding the sides of and overlying said collector means.

5. A beehive as defined in claim 1 wherein said solar unit comprises at least one component which is transparent to solar energy, means supporting said energy transmitting component, and means providing a seal between said energy transmitting component and said support means to keep air from penetrating therebetween.

6. A beehive as defined in claim 5 in which the solar unit has at least two serially arranged, spaced apart solar energy transmitting components, said components being supported from and sealed to said support means as aforesaid to provide a dead air space therebetween.

7. A beehive as defined in claim 5 or claim 6 in which said solar unit has a vertically extending wall means and in which the energy transmitting component or components are supported from and constitute part of said wall means.

8. A beehive as defined in claim 5 or claim 6 in which said solar unit has a slanting top wall and in which said energy transmitting component or components are supported from and constitute part of said top wall.

9. A beehive as defined in claim 1 in which said solar unit has a rectangular parallelopipedal configuration with vertically orientable side and end walls, one of said walls having an opening therein, and said radiant energy transmitting means being mounted in and spanning said opening.

10. A beehive as defined in claim 1 in which said solar unit includes a dome of radiant energy transmitting material surrounding and overlying said passive collector means.

11. A beehive as defined in claim 10 in which said solar unit comprises a second dome as aforesaid spaced from the first-mentioned dome, said domes being sealed together around the periphery and at the bottom edge thereof to provide a dead air insulating space between the domes.

12. A beehive as defined in claim 10 wherein said solar unit has a substructure with vertically extending walls and said dome and said passive collector means have horizontally extending flanges for supporting said dome and said collector means from said substructure.

13. A beehive comprising a body and a removable solar unit mountable on and supportable by said body, said unit having a slanting top wall, a component which is transparent to radiant energy through which solar energy can accordingly penetrate to the interior of said unit, means supporting said energy transmitting component from and incorporating it into said slanting top wall, means providing a seal between said energy transmitting component and said support means to keep air from penetrating therebetween, an internally housed, passive collector means for intercepting and absorbing said solar energy and for thereupon emitting radiant energy into the upper reaches of said beehive body, a vertically extending rear wall faced by said slanting wall, and an opening in the bottom thereof and said passive collector means comprising a reflecting portion adjacent said rear wall and a portion spanning the opening in the bottom wall for intercepting energy reflected onto and impinging thereon and for thereupon emitting energy as aforesaid into said beehive body.

14. A beehive as defined in claim 13 in which the solar unit has at least two serially arranged, spaced apart solar energy transmitting components, said components being supported from and sealed to said support means as aforesaid to provide a dead air space therebetween.

15. A beehive as defined in either of the preceding claims 13 or 14 in which said solar unit has vertical side walls and in which said side walls and said rear wall are insulated.

16. A beehive comprising a body and a removable solar unit mountable on and supportable by said body, said unit having a rectangular parallelopipedal configuration with vertically orientable side and end walls, a bottom wall with an opening therein, radiant energy transmitting means through which solar energy can penetrate to the interior of said unit, and an internally housed passive collector means with a boxlike configuration for intercepting and absorbing said solar energy and for thereupon emitting radiant energy into the upper reaches of said beehive body, one of said vertically orientable walls having an opening therein, said radiant energy transmitting means being mounted in and spanning said opening, and said passive collector means having a bottom wall in and spanning the opening in the bottom wall of said solar unit and a vertically extending wall spaced from said radiant energy transmitting means on which solar energy penetrating to the interior of the solar unit therethrough can impinge.

17. A beehive as defined in claim 16 in which the bottom wall of the passive collector means is flush with the lower surface of the bottom wall of the solar unit.

18. A beehive as defined in claim 16 in which said solar unit includes insulation surrounding portions of the passive collector means.

19. A beehive as defined in any of the preceding claims 1, 13, or 16 which includes a bottom board for supporting the beehive body, said bottom board having a floor and side and rear walls directly supporting said beehive body and providing a gap between said body and said floor at the front side of said beehive body, there being forwardly facing ledges at the inner sides of said bottom board side wall at locations corresponding to the front of the beehive body, and said beehive further comprising a removable member for sealing said gap which is seatable against said ledges on said floor, said member spanning said side walls and extending from said floor to the bottom of the hive body.

20. A beehive comprising a body; a solar unit mountable on and supportable by said body which comprises radiant energy transmitting means through which solar energy can penetrate to the interior thereof and an internally housed passive collector means for intercepting and absorbing said solar energy and for thereupon emitting radiant energy into the upper reaches of said beehive body; and a bottom board for supporting said beehive body, said bottom board having a floor and side and rear walls directly supporting said beehive body and providing a gap between said body and said floor at the front side of said beehive body, there being forwardly facing ledges at the inner sides of said bottom board side walls at locations corresponding to the front of the beehive body, and said beehive further comprising a removable member for sealing said gap which is seatable against said ledges on said floor, said member spanning said side walls and extending from said floor to the bottom of the hive body.

* * * * *